(12) United States Patent
Okabe et al.

(10) Patent No.: US 11,468,165 B2
(45) Date of Patent: Oct. 11, 2022

(54) INTRUSION PREVENTION DEVICE, INTRUSION PREVENTION METHOD, AND PROGRAM

(71) Applicant: NIPPON TELEGRAPH AND TELEPHONE CORPORATION, Chiyoda-ku (JP)

(72) Inventors: Keiichi Okabe, Musashino (JP); Hiroki Itoh, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 291 days.

(21) Appl. No.: 16/636,390

(22) PCT Filed: Jul. 20, 2018

(86) PCT No.: PCT/JP2018/027212
§ 371 (c)(1),
(2) Date: Feb. 4, 2020

(87) PCT Pub. No.: WO2019/035313
PCT Pub. Date: Feb. 21, 2019

(65) Prior Publication Data
US 2020/0175160 A1    Jun. 4, 2020

(30) Foreign Application Priority Data
Aug. 18, 2017  (JP) .............................. JP2017-158089

(51) Int. Cl.
*G06F 21/55*    (2013.01)
*H04L 9/40*    (2022.01)

(52) U.S. Cl.
CPC ........ *G06F 21/554* (2013.01); *H04L 63/1416* (2013.01); *H04L 63/1466* (2013.01); *H04L 63/20* (2013.01)

(58) Field of Classification Search
None
See application file for complete search history.

(56) References Cited

U.S. PATENT DOCUMENTS

| 9,380,070 B1 | 6/2016 | Cain et al. |
| 2004/0123155 A1 | 6/2004 | Etoh et al. |

(Continued)

FOREIGN PATENT DOCUMENTS

JP    2016-162350 A    9/2016

OTHER PUBLICATIONS

International Search Report dated Oct. 23, 2018 in PCT/JP2018/027212 filed on Jul. 20, 2018, citing reference AO therein, 1 page.

*Primary Examiner* — Kevin T Bates
*Assistant Examiner* — Emad Siddiqi
(74) *Attorney, Agent, or Firm* — Oblon, McClelland, Maier & Neustadt, L.L.P.

(57) ABSTRACT

The present invention reduces the time required for inspecting packets and detecting unauthorized commands. An intrusion prevention device (3) is connected to a communication network (9-1) in which a packet including a command for a device to be controlled is transmitted according to a predetermined rule. An analysis table storage part (34) stores an analysis table comprised of a predetermined number of slots for storing a predetermined number of commands together with time information. An input part (31) extracts the command from the packet detected from the communication network (9-1). A parse part (32) inserts the command into the analysis table. An analysis part (33) analyzes whether or not the plurality of commands stored in the respective slots of the analysis table follow the predetermined rule. A notification part (35) outputs an alarm when an analysis (Continued)

result indicates an abnormality. An output part (36) determines whether to pass or discard the packet according to the analysis result.

8 Claims, 7 Drawing Sheets

(56) References Cited

U.S. PATENT DOCUMENTS

| | | | |
|---|---|---|---|
| 2008/0040496 A1* | 2/2008 | Zhao | G06F 40/211 709/230 |
| 2013/0103866 A1* | 4/2013 | Gao | G06F 13/4063 710/106 |
| 2013/0148510 A1 | 6/2013 | Kang et al. | |
| 2016/0381059 A1 | 12/2016 | Galula et al. | |
| 2016/0381066 A1* | 12/2016 | Galula | H04L 63/1441 726/23 |

* cited by examiner

INTRUSION PREVENTION SYSTEM

INTRUSION PREVENTION DEVICE, INTRUSION PREVENTION METHOD, AND PROGRAM

TECHNICAL FIELD

The present invention relates to a technique for preventing intrusion into industrial systems that operate social infrastructures such as, for example, electric power, gas, water supply, chemicals, and oil.

BACKGROUND ART

In the field of Internet technology (hereinafter, referred to as "IT"), cyber attacks such as malware and DDoS (Distributed Denial of Service) attacks have been made, and security techniques such as IDS (Intrusion Detection System), IPS (Intrusion Prevention System), and FW (Firewall) have been developed. Efforts are being made to introduce these security techniques into operation technology (hereinafter referred to as "OT") for operating and controlling various social infrastructures.

In the field of IT, all information within a network is considered as an information asset, and a purpose of ensuring security is to prevent the asset value of the information asset from being damaged for reasons, for example, leakage, deletion, and alteration. On the other hand, in the field of OT, a control device performs control by transmitting a command as a packet to a device to be controlled, and in cyber attacks to an OT network, it is assumed that an important infrastructure itself may be destroyed by disguising commands for the device to be controlled or transmitting excessive amount of commands to the device to be controlled, or the like, and thereby lives of users and operators may be at risk. In cyber attack countermeasures in the OT network, it is necessary to make prevention of such a situation a purpose of ensuring security.

An example of the OT network is a supervisory control network in the industrial systems that operate the social infrastructures. In the system, a control device performs control by transmitting a command as a packet to a device to be controlled. The command is materialized, for example, as a payload of UDP (User Datagram Protocol), and a plurality of commands are included in one UDP payload in implementation.

For the IDS/IPS used in IT networks, proposals have been made to reduce a communication delay and reduce a load which security apparatuses should process without degrading cyber attack detection performance (for example, see Patent literature 1).

PRIOR ART LITERATURE

Patent Literature

Patent literature 1: Japanese Patent Application Laid-Open No. 2016-162350

SUMMARY OF THE INVENTION

Problems to be Solved by the Invention

However, when the IDS/IPS used in IT networks is diverted to cyber attack countermeasures in OT networks, problems like the following will arise.

In the field of OT, commands are regularly transmitted at a cycle of about several hundred milliseconds as a communication characteristic of OT networks, and systems are designed so that fluctuation of the cycle is suppressed within about several milliseconds. In OT networks, when the IDS/IPS for IT networks detects a packet containing an unauthorized command that causes an abnormality, it needs to inspect a large number of signatures, code emulations, and the like. If transmission of a packet is delayed due to those inspections, transmission of a normal command contained in the packet will be also delayed. If a delay exceeding an allowable command cycle fluctuation occurs, there is a possibility of occurrence of another abnormality different from the abnormality which the unauthorized command is going to cause.

In view of the above points, an object of the present invention is to implement an intrusion detection technique that reduces a required time necessary to inspect packets and detect unauthorized commands and that is small in delay of packet transmission.

Means to Solve the Problems

In order to solve the above problems, an intrusion prevention device of the present invention is connected with a network in which a packet containing a command to a device to be controlled is transmitted according to a predetermined rule, and the intrusion prevention device comprises: an analysis table storage part that stores an analysis table comprised of a predetermined number of slots for storing a predetermined number of commands together with time information; a parse part that inserts the command extracted from the packet detected from the network into the analysis table; and an analysis part that analyzes whether or not the plurality of commands stored in the slots of the analysis table follow the predetermined rule.

Effects of the Invention

According to the intrusion detection technique of the present invention, it is possible to reduce a required time necessary to inspect packets and detect unauthorized commands and to reduce a delay of packet transmission.

DETAILED DESCRIPTION OF THE EMBODIMENTS

Figure 1:
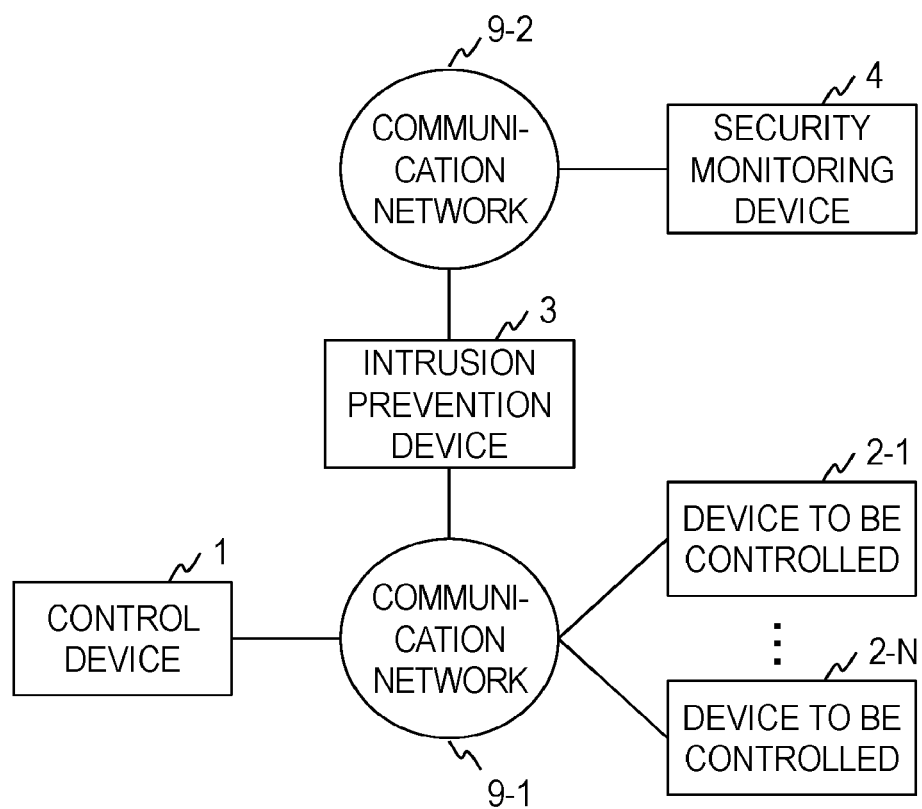
FIG. 1 is a diagram illustrating a functional configuration of an intrusion prevention system.

Hereinafter, an embodiment of the present invention will be described in detail. Note that the same reference numerals are assigned to constitution parts having the same functions in the drawings, and redundant description will be omitted.

An intrusion prevention system of the embodiment includes a control device 1, at least one device to be controlled 2-*n* (n=1, 2, . . . ; n is an integer of one or more), an intrusion prevention device 3, and a security monitoring device 4 as shown in FIG. 1. The control device 1 and the device to be controlled 2-*n* are each connected to a communication network 9-1. The intrusion prevention device 3 is configured as a network apparatus included in the communication network 9-1, and is connected to a communication network 9-2 physically or logically divided from the communication network 9-1. The security monitoring device 4 is connected to the communication network 9-2. The communication network 9-1 and the communication network 9-2 are circuit-switched or packet-switched communication networks configured such that connected devices can communicate with each other.

The intrusion prevention device 3 may be, for example, a general-purpose network apparatus such as an L2 switch, an L3 switch, a bridge, or a router provided with functions to be described later as functions which the intrusion prevention device 3 should have, or may be a dedicated network apparatus that has implemented the functions to be described later. It may be a dedicated device configured by causing a general-purpose computer to read a program implementing the functions to be described later. The intrusion prevention device 3 may be built with a dedicated PAL (Programmable Array Logic), GAL (Generic Array Logic), FPGA (Field-Programmable Gate Array), or the like including a dedicated CPU (Central Processing Unit) implementing performance specializing in the functions to be described later in order to achieve low delay processing required as a communication requirement for the OT network.

The control device 1 and the device to be controlled 2-*n* are a control device and a device to be controlled used in a conventional OT network. The control device 1 transmits a packet containing a command for the device to be controlled 2-*n* to the device to be controlled 2-*n* at a constant time cycle. The device to be controlled 2-*n* operates according to the command contained in the received packet.

In the embodiment, the device to be controlled 2-*n* is assumed to have a plurality of states and have commands to change to other states for the respective states. For example, the device to be controlled 2-*n* is assumed to be a signal that includes three electric lamps of red, blue and yellow, and has a function capable of turning on or off the electric lamp for each color. The control device 1 transmits one packet containing a command to instruct to turn on or off the three electric lamps to the device to be controlled 2-*n* every second. The device to be controlled 2-*n* controls the lit states of the respective three electric lamps according to the command contained in the packet received every constant time.

Figure 2:
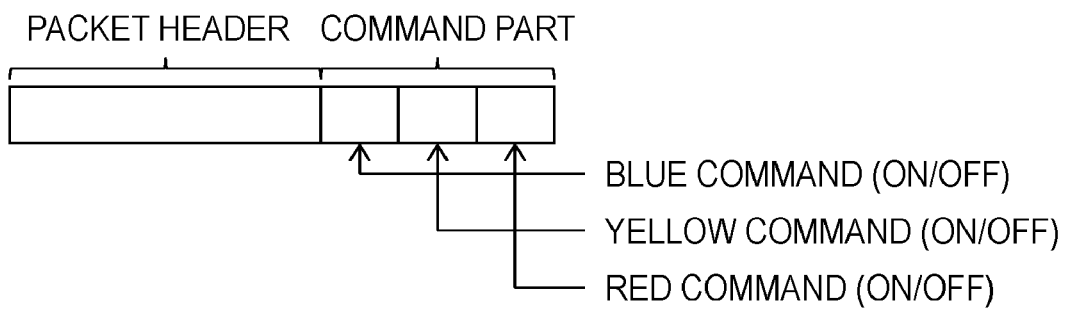
FIG. 2 is a diagram illustrating a structure of a packet transmitted by a control device.

FIG. 2 shows an example of a packet containing a command instructing to turn on or off the three electric lamps. The packet includes a packet header and a command part, and the command part is composed of a blue command instructing to turn on or off the blue electric lamp, a yellow command instructing to turn on or off the yellow electric lamp, and a red command instructing to turn on or off the red electric lamp.

Figure 3:
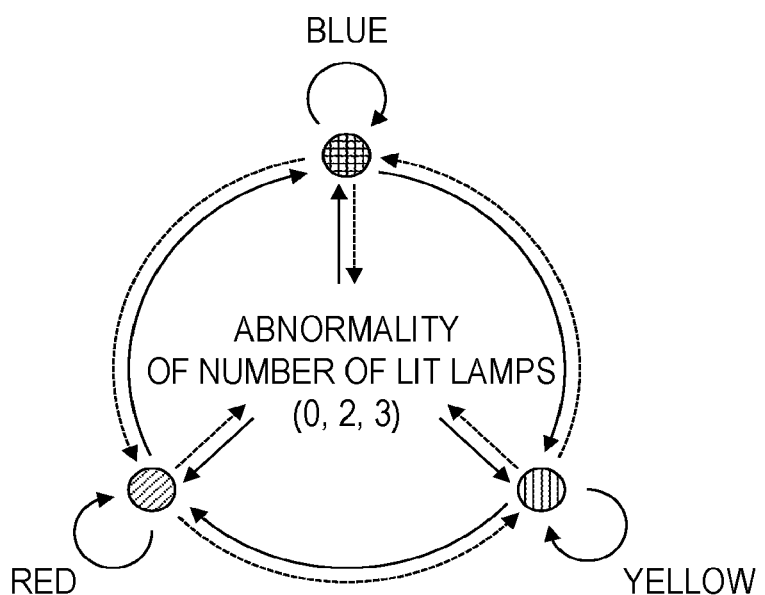
FIG. 3 is a diagram illustrating a state transition of a device to be controlled.

FIG. 3 shows state transitions of the three electric lamps included in the device to be controlled 2-*n*. In FIG. 3, normal state transitions are indicated by solid arrows, and abnormal state transitions are indicated by dashed arrows. The repetition of "blue"→"yellow"→"red"→"blue"→ . . . of the electric lamps of the signal is assumed to be a normal state transition, and "yellow"→"blue,"→"blue"→"red," and "red"→"yellow" are assumed to be abnormal state transitions. Continuing the same state is a normal state transition. It is assumed that there should not be a state in which a plurality of electric lamps are on at the same time (case where the number of lit electric lamps is two or three) or a state in which all the electric lamps are off (case where the number of lit electric lamps is zero). Furthermore, it is also assumed that the arrival of packets should not be delayed by 0.5 seconds or more.

In a conventional intrusion prevention device, a rule is designed which clearly indicates whether each of the state transitions shown in FIG. 3 is a normal state transition or an abnormal state transition, and if in the case of abnormal state transition, the conventional intrusion prevention device warns an administrator of the whole system without influencing a packet containing a command or discards the packet containing the command to prevent the whole system from becoming abnormal.

Figure 4:
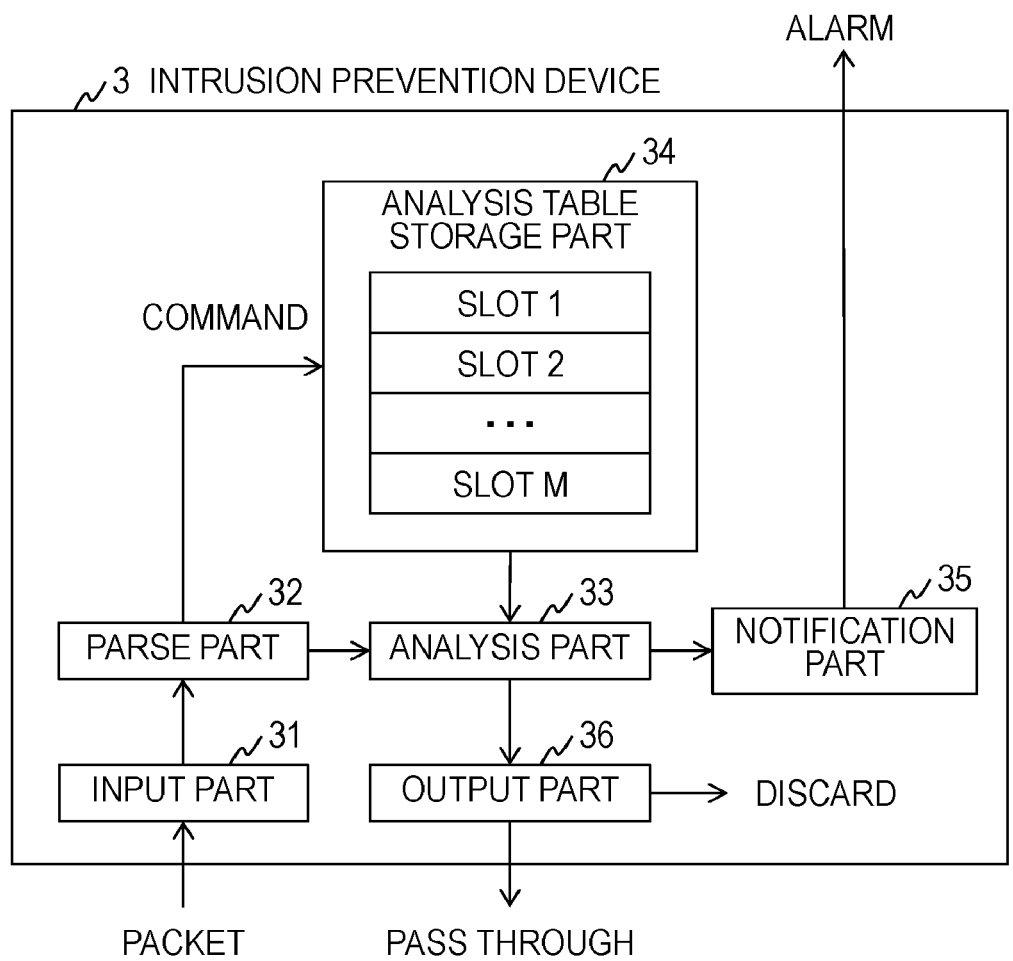
FIG. 4 is a diagram illustrating a functional configuration of an intrusion prevention device.
Figure 5:
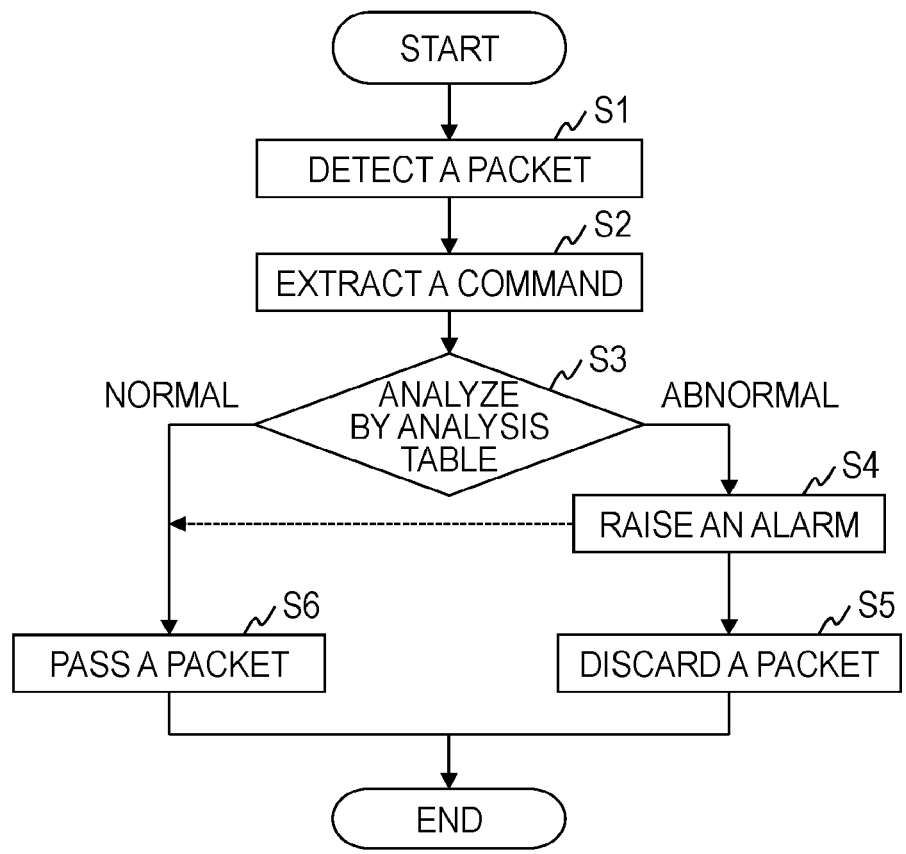
FIG. 5 is a diagram illustrating a processing procedure of an intrusion prevention method.

The intrusion prevention device 3 of the embodiment includes an input part 31, a parse part 32, an analysis part 33, an analysis table storage part 34, a notification part 35, and an output part 36 as shown in FIG. 4. The intrusion prevention device 3 executes processing of steps shown in FIG. 5 and thereby implements an intrusion prevention method of the embodiment.

The analysis table storage part 34 stores an analysis table including M (M≥2) slots. The number of slots included in the analysis table is limited, and it may be designed to cover a time necessary for observation on the basis of intervals at which the control device 1 transmits packets. For example, the number of slots is seven. One slot stores only one content of the command contained in a packet received at the constant time cycle. For example, the above control device uses 0.5 seconds as a unit time and determines which slot the content should be stored in on the basis of time information when the packet has been received. The analysis table shifts the slots every above unit time. A command contained in a packet received newly is stored in the head slot of the analysis table, and a command stored in the end slot is deleted. That is, the analysis table uses a predetermined number of slots for storing commands and stores in time series a predetermined number of commands together with time information.

In step S1, the input part 31 detects a packet containing a command transmitted by the control device 1 from the communication network 9-1 and uses the packet as an input to the intrusion prevention device 3. The input part 31 transmits the detected packet to the parse part 32.

In step S2, the parse part 32 receives the packet from the input part 31, extracts the command from the packet, and inserts the command together with the time information into the head slot of the analysis table stored in the analysis table storage part 34. The time information is information indicating time when the input part 31 has received the packet. In the analysis table, commands already stored are shifted by one time unit and a command stored in the end slot is deleted.

In step S3, the analysis part 33 analyzes a plurality of commands stored in the respective slots of the analysis table stored in the analysis table storage part 34, and generates an analysis result indicating normality or abnormality. A method for determining normality or abnormality from the analysis table is to determine whether the plurality of commands stored in the analysis table follow a known rule, and specifically to analyze whether the state transition is performed normally by inspections such as normality confirmation of positions of the slots storing data, normality confirmation of data between the slots, normality confirmation of data within the slots, and timeout detection. The analysis methods of normality will be described later. The analysis part 33 advances the processing to step S4 if the analysis result indicates abnormality, and advances the processing to step S6 if the analysis result indicates normality.

In step S4, the notification part 35 transmits an alarm notifying the occurrence of abnormality to the security monitoring device 4. The security monitoring device 4 notifies a system administrator of the occurrence of abnormality on the basis of the received alarm by a method, for example, displaying a message on a monitoring screen. However, the transmission of the alarm is not essential, and it may be determined whether to transmit an alarm depending on a type of abnormality, an abnormality occurrence frequency, or the like. Note that step S4 executed by the notification part 35 can be executed in parallel with step S5 or step S6 executed by the output part 36.

In step S5, the output part 36 discards a packet whose analysis result indicates an abnormality. However, it is not an essential configuration to discard a packet whose analysis result indicates an abnormality, and, for example, it is also possible to have a configuration to only transmit an alarm but pass the packet as is. In this case, after executing processing of step S4, the processing is advanced to step S6 but not step S5. However, in the case of the configuration of passing the packet as is, transmission of an alarm is an essential configuration.

In step S6, the output part 36 transmits and passes a packet as is whose analysis result indicates normality. Then, the device to be controlled 2-$n$ performs operation according to content instructed by the command contained in the received packet.

Hereinafter, analysis methods performed by the analysis part 33 are described in detail taking the following four cases as an example: normality confirmation of the positions of the slots; normality confirmation of data between the slots; normality confirmation of data within the slots; and timeout detection. It is not necessary to implement all these analysis methods, and it is sufficient to appropriately select and implement a method suitable for a known rule which the packet follows.

<Normality Confirmation of Position of Slot>

Figure 6:
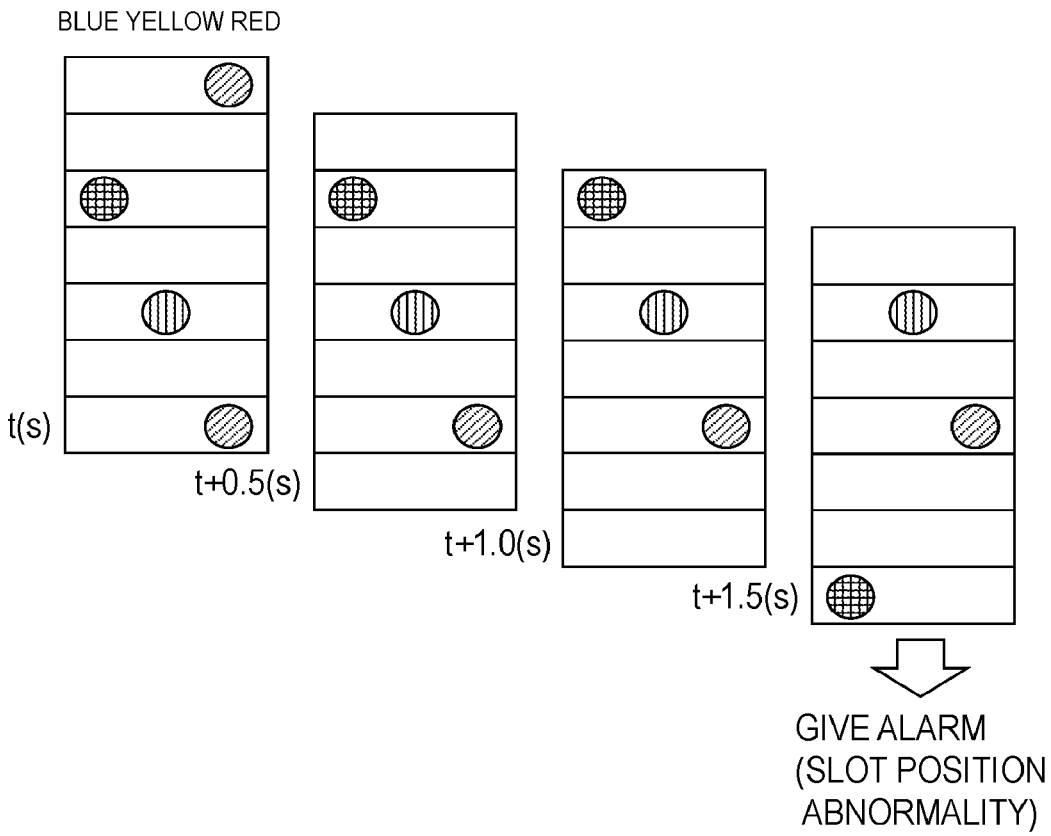
FIG. 6 is a diagram for explaining normality confirmation of a slot position.

The method for confirming normality of the positions of the slots will be described with reference to FIG. 6. FIG. 6 shows states of analysis tables arranged from left to right every 0.5 seconds from t seconds to t+1.5 seconds. In the slots in each analysis table, the lowest slot is a head slot and the highest slot is an end slot. That is, the state at each unit time is arranged in time series from down to up. A round object within each slot represents an instruction to turn on an electric lamp. For example, in the analysis table at the time of t seconds (leftmost), it is found that a command including an instruction to turn on the red electric lamp is the latest one.

In the case where it is known that the control device 1 transmits a packet in units of one second and it is determined to be abnormal if arrival of the packet is delayed by 0.5 seconds, it is enough to confirm whether slots storing commands within the analysis table are placed every other slot. In the example of FIG. 6, in the analysis table at the time of t+1.5 seconds (rightmost), slots storing commands are the first, fourth, and sixth from the bottom, and it is found that the latest packet is delayed by 0.5 seconds. Thus, the analysis part 33 outputs an analysis result indicating an abnormality of the slot position at the time of t+1.5 seconds.

<Normality Confirmation of Data between Slots>

Figure 7:
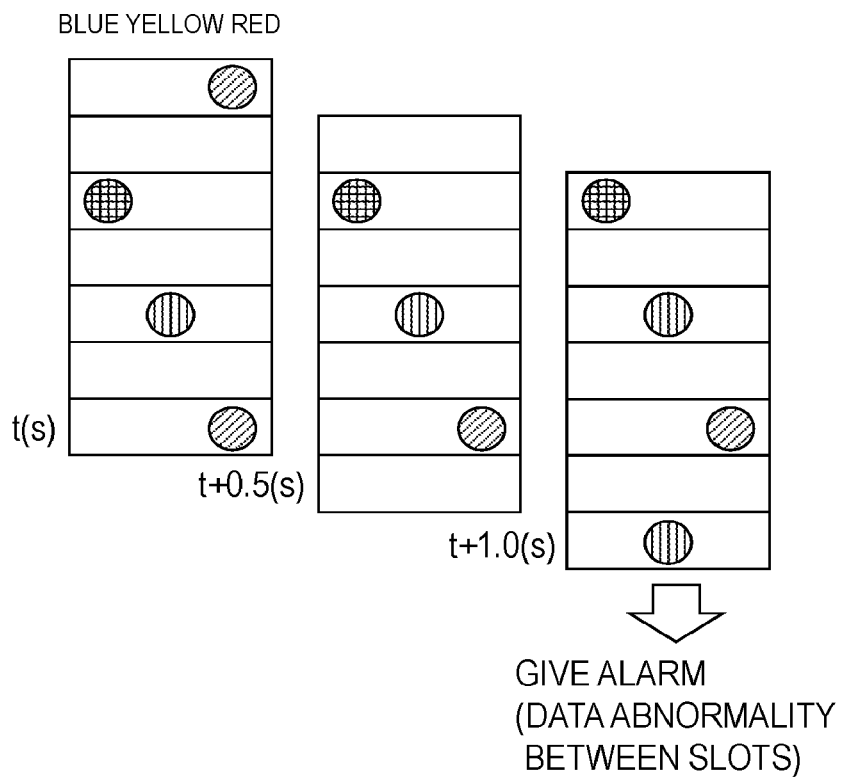
FIG. 7 is a diagram for explaining normality confirmation of data between slots.

The method for confirming normality of data between the slots will be described with reference to FIG. 7. If a rule of order which commands can take is known, data may be compared between the slot storing the latest command within the analysis table and the slot storing a command before by one and it may be confirmed whether they are along the known order. In the example of FIG. 7, in the analysis table at the time of t+1.0 seconds (rightmost), the slot storing the latest command stores a command to turn on the yellow electric lamp, and the slot storing the command before by one stores a command to turn on the red electric lamp. Because the state transition of "red"→"yellow" is an abnormal state transition, the analysis part 33 outputs an analysis result indicating a data abnormality between the slots at the time of t+1.0 seconds.

<Normality Confirmation of Data within Slot>

Figure 8:
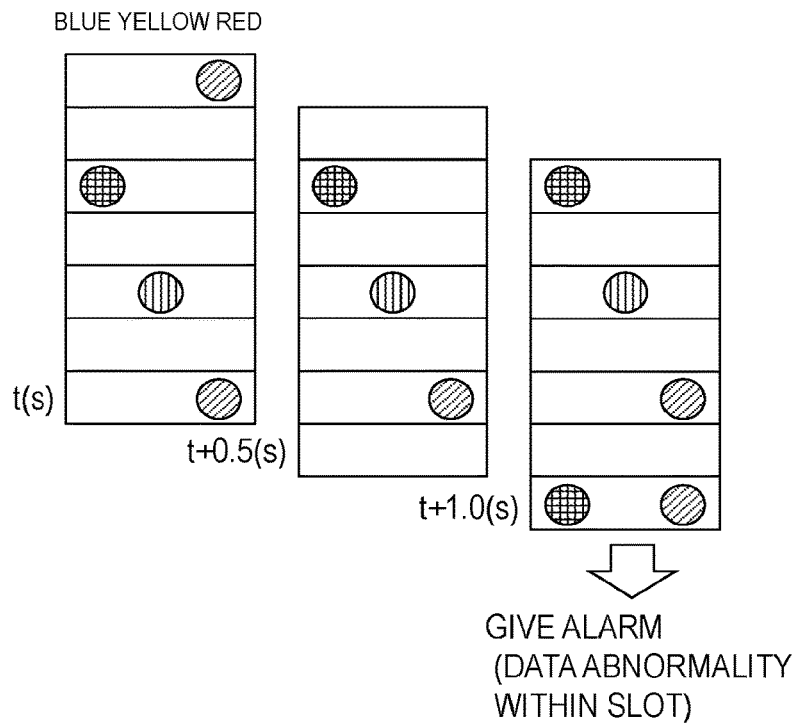
FIG. 8 is a diagram for explaining normality confirmation of data within a slot.

The method for confirming normality of data within the slots will be described with reference to FIG. 8. If a rule which data within the slots can follow is known, it may refer to content of the slot storing the latest command in the analysis table and confirm whether the data is along the known rule. In the example of FIG. 8, in the analysis table at the time of t+1.0 seconds (rightmost), the slot storing the latest data stores a command to simultaneously turn on the blue and red electric lamps. Because it is considered abnormal that a plurality of electric lamps are turned on at the same time, the analysis part 33 outputs an analysis result indicating data abnormality within the slots at the time of t+1.0 seconds.

<Detection of Timeout>

Figure 9:
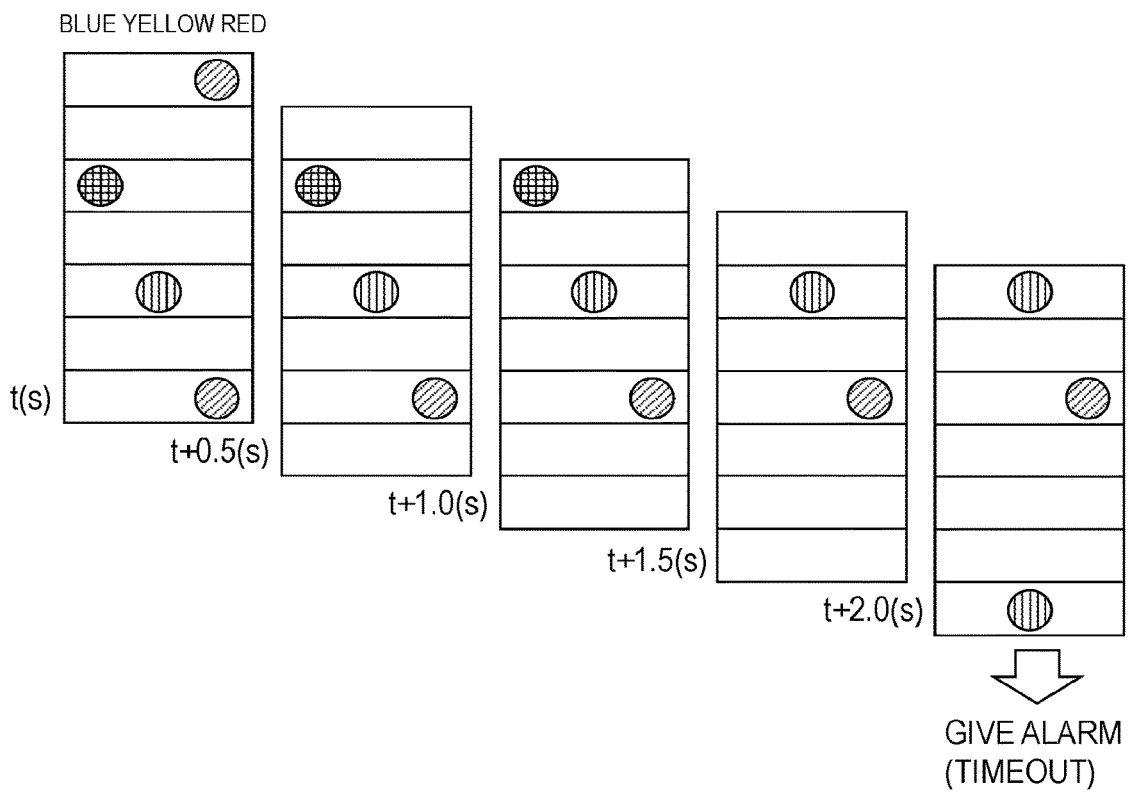
FIG. 9 is a diagram for explaining timeout detection.

The method for detecting timeout of a packet as in the case where the packet has not arrived for any reason will be described with reference to FIG. 9. In the case where it is known that the control device 1 transmits a packet in units of one second, in order to detect the timeout of the packet, it may need to confirm positions of the slot storing the latest command within the analysis table and the slot storing the command before by one. In the example of FIG. 9, in the analysis table at the time of t+2.0 seconds (rightmost), it is found that there are three empty slots between the slot storing the latest command and the slot storing the command before by one, and there is an interval of two seconds from receiving the packet before by one to receiving the latest packet. Because a packet that should be received at the time of t+1.0 seconds has not arrived, the analysis part 33 outputs an analysis result indicating an abnormality due to timeout at the time of t+2.0 seconds.

The logic of the analysis methods performed by the analysis part 33 will be described more specifically. In the following, the explanation will be given by dividing into four cases for each of the known rules among the rules followed by the packets.

<Case 1: It is known that Data within a Packet changes Periodically>

If values of G, Y, and R do not correspond to any of the following (1)-(4) using a certain time (t=0) as a reference, it is regarded as abnormal. Note that G denotes a blue command, Y a yellow command, and R a red command.

$$\text{If } t=3.0*1[\sec](1=0,1,2,\ldots), \text{ then } G=1, Y=0, R=0. \quad (1)$$

$$\text{If } t=3.0*m+1.0[\sec](m=0,1,2,\ldots), \text{ then } G=0, Y=1, R=0. \quad (2)$$

$$\text{If } t=3.0*n+2.0[\sec](n=0,1,2,\ldots), \text{ then } G=0, Y=0, R=1. \quad (3)$$

$$\text{If } t=1.0*k+0.5[\sec](k=0,1,2,\ldots), \text{ then } G=0, Y=0, R=0. \quad (4)$$

Table 1 shows contents of commands at each time and analysis results of each. Since the command at t=4.5 corresponds to the above (4) because 4.5=1.0*4+0.5, originally it must be G=0, Y=0, R=0, but G=0, Y=1, R=0 in practice; therefore it is judged as abnormal. In addition, since the command at t=6.0 corresponds to the above (1) because 6.0=3.0*2, originally it should be G=1, Y=0, R=0, but G=1, Y=1, R=0 in practice; therefore it is judged as abnormal.

TABLE 1

| t [s] | G | Y | R | Analysis result |
|---|---|---|---|---|
| 0.0 | 1 | 0 | 0 | Normal |
| 0.5 | 0 | 0 | 0 | Normal |
| 1.0 | 0 | 1 | 0 | Normal |
| 1.5 | 0 | 0 | 0 | Normal |
| 2.0 | 0 | 0 | 1 | Normal |
| 2.5 | 0 | 0 | 0 | Normal |
| 3.0 | 1 | 0 | 0 | Normal |
| 3.5 | 0 | 0 | 0 | Normal |
| 4.0 | 0 | 1 | 0 | Normal |
| 4.5 | 0 | 1 | 0 | *Abnormal* |
| 5.0 | 0 | 0 | 1 | Normal |
| 5.5 | 0 | 0 | 0 | Normal |
| 6.0 | 1 | 1 | 0 | *Abnormal* |
| 6.5 | 0 | 0 | 0 | Normal |
| . | . | . | . | |
| . | . | . | . | |
| . | . | . | . | |

<Case 2: Range of Values that Data within a Packet can take for each Slot is known>

It is checked whether values in a command at each time are within a range where they can take, and a command having a value outside the range where it can take is regarded as abnormal.

Table 2 shows content of the command at each time and analysis results of each. The command at t=3.0 is judged as abnormal because the value of G (=20) is outside the range (0, . . . , 10) where it can take. The command at t=6.0 is judged as abnormal because the value of R (=4) is outside the range (0, . . . , 3) where it can take.

TABLE 2

| | G | Y | R | |
|---|---|---|---|---|
| | Range of possible values | | | Analysis |
| t [s] | 0 . . . 10 | 0 . . . 5 | 0 . . . 3 | result |
| 0.0 | 1 | 0 | 0 | Normal |
| 1.0 | 5 | 0 | 0 | Normal |
| 2.0 | 10 | 1 | 1 | Normal |
| 3.0 | 20 | 1 | 2 | *Abnormal* |
| 4.0 | 10 | 2 | 2 | Normal |
| 5.0 | 8 | 3 | 3 | Normal |
| 6.0 | 6 | 4 | 4 | *Abnormal* |
| 7.0 | 4 | 4 | 3 | Normal |
| . | . | . | . | |
| . | . | . | . | |
| . | . | . | . | |

<Case 3: Range where Difference of Data of a Packet with a Previous Slot for each Slot can take is known>

Determination is performed in the following procedure using a certain time t=$t_0$ [sec] as a reference.

(1) Values of G, Y, and R at t=$t_0$ are denoted by $G(t_0)$, $Y(t_0)$, and $R(t_0)$, respectively.

(2) It is assumed that the range where difference of values of G, Y, and R between slots before and after can take is as follows.

$$\Delta G_{min} < G(t_0-1) - G(t_0) < \Delta G_{max}$$

$$\Delta Y_{min} < Y(t_0-1) - Y(t_0) < \Delta Y_{max}$$

$$\Delta R_{min} < R(t_0-1) - R(t_0) < \Delta R_{max}$$

Here, $\Delta G_{min}$ and $\Delta G_{max}$ are the minimum value and the maximum value respectively of difference between values that G can take, $\Delta Y_{min}$ and $\Delta Y_{max}$ are the minimum value and the maximum value respectively of difference between values that Y can take, and $\Delta R_{min}$ and $\Delta R_{max}$ are the minimum value and the maximum value respectively of difference between values that R can take.

(3) If there is a difference exceeding the above at any of between $G(t_0-1)$ and $G(t_0)$, between $Y(t_0-1)$ and $Y(t_0)$, and between $R(t_0-1)$ and $R(t_0)$, it is regarded as abnormal.

Table 3 shows content of the command at each time and analysis results of each. The command at t=3.0 is judged as abnormal because the difference of G (+15) exceeds a range (−10, . . . , 10) of difference of values where it can take. The command at t=6.0 is judged as abnormal because the difference of R (−5) exceeds a range (−3, . . . , 3) of difference of values where it can take.

TABLE 3

| | G | | Y | | R | | |
|---|---|---|---|---|---|---|---|
| | Range of difference of possible values | | | | | | |
| | −10 . . . 10 | | −5 . . . 5 | | −3 . . . 3 | | Analysis |
| t [s] | Value | Increment | Value | Increment | Value | Increment | result |
| 0.0 | 1 | — | 0 | — | 0 | — | Normal |
| 1.0 | 5 | +4 | 0 | 0 | 0 | 0 | Normal |
| 2.0 | 10 | +5 | 1 | +1 | 1 | +1 | Normal |
| 3.0 | 25 | +15 | 1 | 0 | 2 | +1 | *Abnormal* |
| 4.0 | 20 | −5 | 2 | +1 | 2 | 0 | Normal |
| 5.0 | 15 | −5 | 3 | +1 | 3 | +1 | Normal |
| 6.0 | 10 | −5 | 4 | +1 | −2 | −5 | *Abnormal* |
| 7.0 | 0 | 0 | 4 | 0 | 0 | +2 | Normal |
| . | . | . | . | . | . | . | |
| . | . | . | . | . | . | . | |
| . | . | . | . | . | . | . | |

<Case 4: Interaction (Preceding, Lagging, Retrogression) of each Value in a Command is known>

Preceding and lagging means that when one value A changes, then another value B belatedly changes in the same manner. At this time, it is said that the value A precedes the value B and the value B lags behind the value A. Retrogression means that when one value A changes, then another value B changes in an opposite direction.

Determination is performed in the following procedure using a certain time $t=t_0$ [sec] as a reference.

(1) Values of G, Y, and R at $t=t_0$ are denoted by $G(t_0)$, $Y(t_0)$, and $R(t_0)$, respectively.

(2) When it is transitioned from $t-t_n$ to $t-t_{n+1}$, it is regarded as abnormal if the following is not satisfied.

In the case of preceding and lagging (Y(t) and R(t) lag behind G(t)):

$$\text{if } G(t_{n+1})-G(t_n)>0, \text{ then } Y(t_{n+2})-Y(t_{n+1})>0 \text{ and } R(t_{n+2})-R(t_{n+1})>0; \quad (1\text{-}1)$$

and $$\text{if } G(t_{n+1})-G(t_n)<0, \text{ then } Y(t_{n+2})-Y(t_{n+1})<0 \text{ and } R(t_{n+2})-R(t_{n+1})<0. \quad (1\text{-}2)$$

In the case of retrogression (Y(t) and R(t) go back against G(t)):

$$\text{if } G(t_{n+1})-G(t_n)>0, \text{ then } Y(t_{n+1})-Y(t_n)<0 \text{ and } R(t_{n+1})-R(t_n)<0; \quad (2\text{-}1)$$

and $$\text{if } G(t_{n+1})-G(t_n)<0, \text{ then } Y(t_{n+1})-Y(t_n)>0 \text{ and } R(t_{n+1})-R(t_n)>0. \quad (2\text{-}2)$$

In the case of lagging and retrogression (Y(t) and R(t) lag behind and go back against G(t)):

$$\text{if } G(t_{n+1})-G(t_n)>0, \text{ then } Y(t_{n+2})-Y(t_{n+1})<0 \text{ and } R(t_{n+2})-R(t_{n+1})<0; \quad (3\text{-}1)$$

and $$\text{if } G(t_{n+1})-G(t_n)<0, \text{ then } Y(t_{n+2})-Y(t_{n+1})>0 \text{ and } R(t_{n+2})-R(t_{n+1})>0. \quad (3\text{-}2)$$

Table 4 shows content of the command at each time and analysis results of each. Although the command at t=6.0 is under the condition that Y lags behind G(t), Y(6.0)−Y(5.0)>0(+5) when G(5.0)−G(4.0)<0(−5), which does not conform to the above rule (1-2); therefore it is regarded as abnormal.

[Modified Example]

Figure 10:
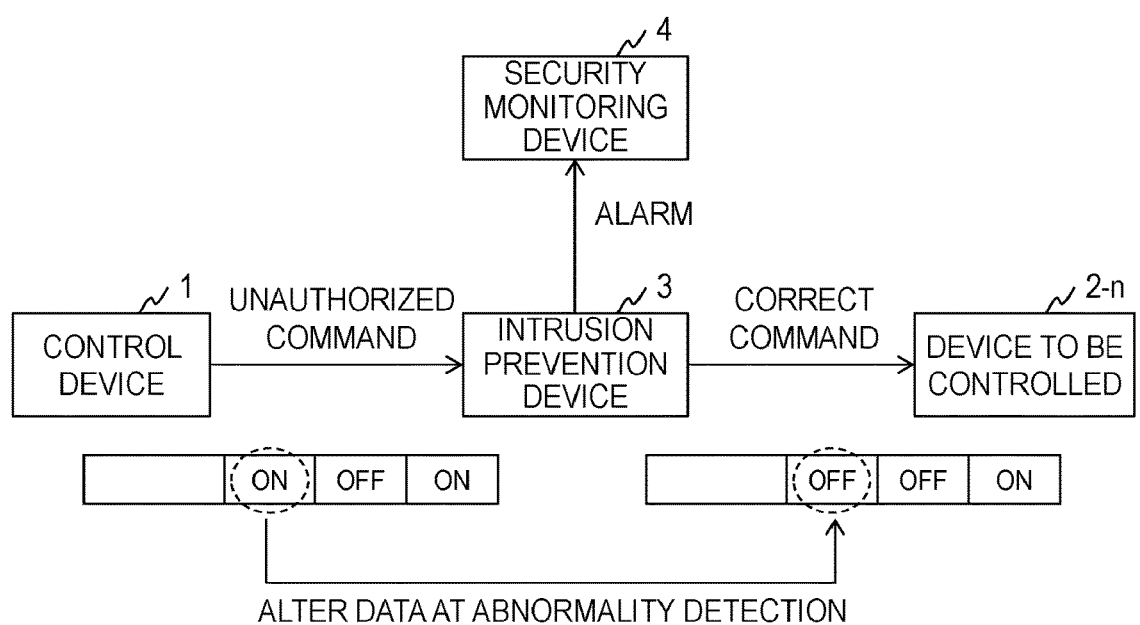
FIG. 10 is a diagram for explaining packet alteration at abnormality detection.

In the above embodiment, the example is shown in which when an analysis result of the analysis part 33 indicates an abnormality, the output part 36 discards a packet or the notification part 35 transmits an alarm to the security monitoring device 4 and the output part 36 passes the packet. If it is configured to transmit an alarm and pass a packet as is for an only purpose of detecting an abnormality, it may be also considered that the whole system may fall into a dangerous state depending on a situation of the abnormality. Therefore, in order to prevent an abnormal command from being propagated, the intrusion prevention device 3 in a modified example alters the content of a command contained in a packet transmitted by the output part 36 to conform to the known rule if an analysis result of the analysis part 33 indicates an abnormality. This allows a device to be controlled 2-$n$ that receives the packet to receive only a normal command conforming to the known rule, and thereby to avoid the risk of causing an abnormal operation. FIG. 10 is an example of operation to alter a packet at the time of abnormality detection. In the example, since a packet received by the intrusion prevention device 3 includes an unauthorized command to turn on a plurality of electric lamps, the command is altered from an instruction to turn on the blue electric lamp to an instruction to turn off it so as to conform to the known rule, and a command to turn on the red electric lamp only is transmitted.

[Effects]

The conventional intrusion prevention device has implemented a state transition diagram of a device to be controlled and rules to identify abnormal transition and determined whether generated state transition is normal transition or abnormal transition. That is, the rules to identify abnormal transition are stored in a database or a memory, and individual commands are inspected and analyzed one by one to determine whether the state transition of the device to be controlled is normal or abnormal. Because of this, there has been a concern that a processing time increases as rules to identify abnormal transition increase and processing such as inspection, analysis, and coping is not completed within a delay time allowed by the OT network.

In contrast to that, in the present invention, individual commands are not sequentially inspected or analyzed, and the contents of the commands are held in time series in the analysis table together with time information, then the normality of the state transition of the commands is con-

TABLE 4

| | G | | Y | | R | | |
| --- | --- | --- | --- | --- | --- | --- | --- |
| | | | Condition | | | | |
| | | | Lagging behind G(t) | | Lagging behind and retrogressive to G(t) | | Normality |
| t [s] | Value | Increment | Value | Increment | Value | Increment | determination |
| 0.0 | 1 | — | 1 | — | −1 | — | Normal |
| 1.0 | 5 | +4 | 1 | 0 | −1 | 0 | Normal |
| 2.0 | 10 | +5 | 5 | +4 | −5 | −4 | Normal |
| 3.0 | 15 | +5 | 10 | +5 | −10 | −5 | Normal |
| 4.0 | 20 | −5 | 15 | +5 | −15 | −5 | Normal |
| 5.0 | 15 | −5 | 20 | −5 | −20 | +5 | Normal |
| 6.0 | 10 | −5 | 25 | +5 | −15 | +5 | *Abnormal* |
| 7.0 | 5 | 0 | 20 | −5 | −10 | +5 | Normal |
| . | . | . | . | . | . | . | |
| . | . | . | . | . | . | . | |
| . | . | . | . | . | . | . | | firmed, and thereby a required time necessary for processing such as inspection, analysis, and coping, that is, a delay caused by applying the intrusion prevention device can be further reduced.

In the case of <Case 1> above, the normality confirmation can be verified only by a bit mask operation between slots with specific time intervals (intervals of three seconds in the case of <Case 1>), which is a method that can be implemented by an extremely small amount of calculation compared with the case having complicated signatures and verifying matching of data strings.

Also in the cases of <Case 2>, <Case 3>, and <Case 4> above, since the normality confirmation is performed by simple multiplication and subtraction of numbers between slots, these are also methods that can be implemented with a small amount of calculation.

As described in the modified example above, the intrusion prevention device can raise an alarm and retransmit a received packet in parallel in the case of only detecting an abnormality. At this time, in addition to only detecting an abnormality, in order to prevent an abnormal packet from being propagated or an abnormal command from being executed, not only an alarm is issued, it is also possible for the output part 36 to alter the content of the packet to a safe command, and retransmit the packet as a packet containing a command that prevents the whole system from falling into a dangerous stage. Such a configuration enables the OT network to be operated more safely.

Although the embodiment of the present invention has been described above, specific configurations are not limited to the embodiment, and it goes without saying that even if there are appropriate design changes and the like in a range not departing from the spirit of the present invention, they are included in the present invention. The various types of processing described in the embodiment is not only executed chronologically according to the order described but may be executed in parallel or individually depending on processing capability of an apparatus executing the processing or necessity.

[Program and Recording Medium]

When the various processing functions of the devices described in the embodiment are implemented by a computer, processing contents of the functions which the devices should have are described by a program. The program is then executed by the computer and the various processing functions of the devices are implemented on the computer.

The program describing the processing contents can be recorded in a computer-readable recording medium. The computer-readable recording medium may be any of, for example, a magnetic recording device, an optical disc, a magneto-optical recording medium, and a semiconductor memory.

The program is distributed, for example, by selling, transferring, and lending a portable recording medium such as a DVD or a CD-ROM recording the program. Furthermore, the program may be stored in a storage device of a server computer, transferred from the server computer to another computer via a network, and thereby distributed.

The computer that executes such a program, for example, first stores the program recorded in the portable recording medium or the program transferred from the server computer in its own storage device. Then, at the time of executing processing, the computer reads the program stored in the own storage device and executes processing according to the read program. As another executing form of the program, the computer may directly read the program from the portable recording medium and execute processing according to the program, and furthermore may sequentially execute processing according to a received program whenever the program is transferred from the server computer to the computer. The processing above may be executed by a so-called ASP (Application Service Provider) type service that implements processing functions only by execution instructions and result acquisition without transferring the program from the server computer to the computer. The program in the embodiment includes information that is provided for processing by an electronic computer and conforms to a program (such as data that is not a direct command for the computer but has a property that defines the processing of the computer).

In the embodiment, although the device is configured by executing the predetermined program on the computer, at least part of the processing contents may be implemented by hardware.

What is claimed is:

1. An intrusion prevention device connected with a network in which a packet containing a command for a device to be controlled is transmitted according to a predetermined rule, the intrusion prevention device comprising:
   processing circuitry configured to:
      store an analysis table comprised of a predetermined number of slots for storing each the command, the analysis table configured to store new information in the head slot of the analysis table by shifting the slot every predetermined time;
      insert the command extracted from the packet detected from the network into the head slot of the analysis table together with the detected time of the packet; and
      analyze whether or not the plurality of the commands stored in the slots of the analysis table follow the predetermined rule,
   wherein the processing circuitry
      analyzes whether or not positions of slots storing the commands among the slots of the analysis table match a constant time cycle, and
      when an analysis result indicates an abnormality, alters contents of the command included in the packet detected from the network into contents that can be set according to the predetermined rule, and transmits the packet to the net.

2. The intrusion prevention device according to claim 1, wherein
   the processing circuitry analyze whether or not differences among the commands stored in the slots of the analysis table match a change that can be caused when commands are set according to the predetermined rule.

3. A non-transitory computer-readable recording medium on which a program for causing a computer to operate as the intrusion prevention device according to claim 2.

4. The intrusion prevention device according to claim 1, wherein
   the processing circuitry analyze whether or not contents of the commands stored in the slots of the analysis table are contents that can be set according to the predetermined rule.

5. The intrusion prevention device according to any of claims 1, 2, and 4, wherein
   the processing circuitry output an alarm notifying occurrence of an abnormality when an analysis result indicates the abnormality.

6. A non-transitory computer-readable recording medium on which a program for causing a computer to operate as the intrusion prevention device according to claim 4.

7. A non-transitory computer-readable recording medium on which a program for causing a computer to operate as the intrusion prevention device according to claim 1.

8. An intrusion detection method executed by an intrusion prevention device connected with a network in which a packet containing a command for a device to be controlled is transmitted according to a predetermined rule, the intrusion detection method comprising:
- storing an analysis table comprised of a predetermined number of slots for storing each the command, the analysis table configured to store new information in the head slot of the analysis table by shifting the slot every predetermined time;
- inserting the command extracted from the packet detected from the network into the head slot of the analysis table together with the detected time of the packet; and
- analyzing whether or not the plurality of the commands stored in the slots of the analysis table follow the predetermined rule, wherein the method further includes
- analyzing whether or not positions of slots storing the commands among the slots of the analysis table match a constant time cycle, and
- when an analysis result indicates an abnormality, altering contents of the command included in the packet detected from the network into contents that can be set according to the predetermined rule, and transmitting the packet to the network.

* * * * *